(No Model.)
G. W. VAN TASSEL.
STRAINER FOR EAVES SPOUTS.
No. 289,473. Patented Dec. 4, 1883.
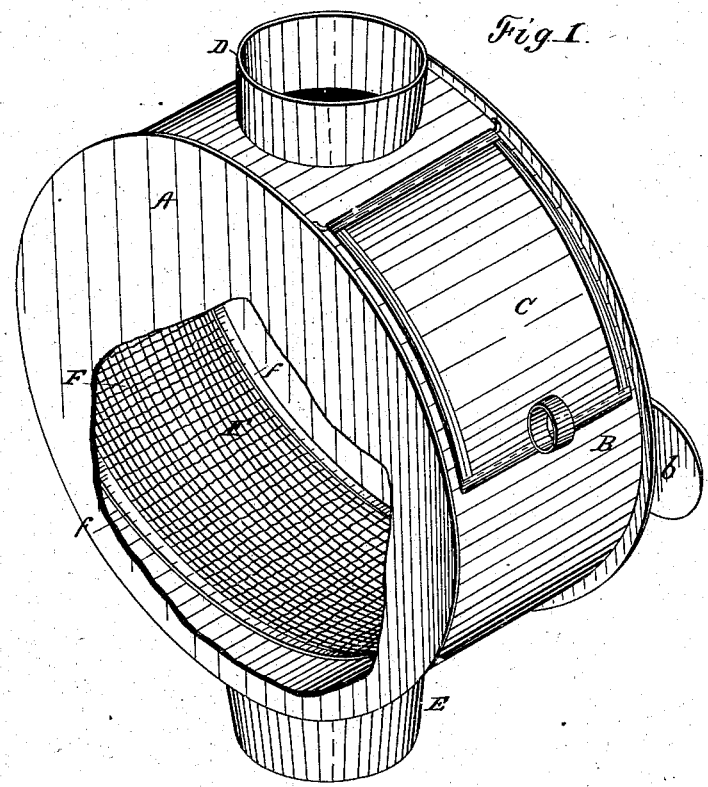
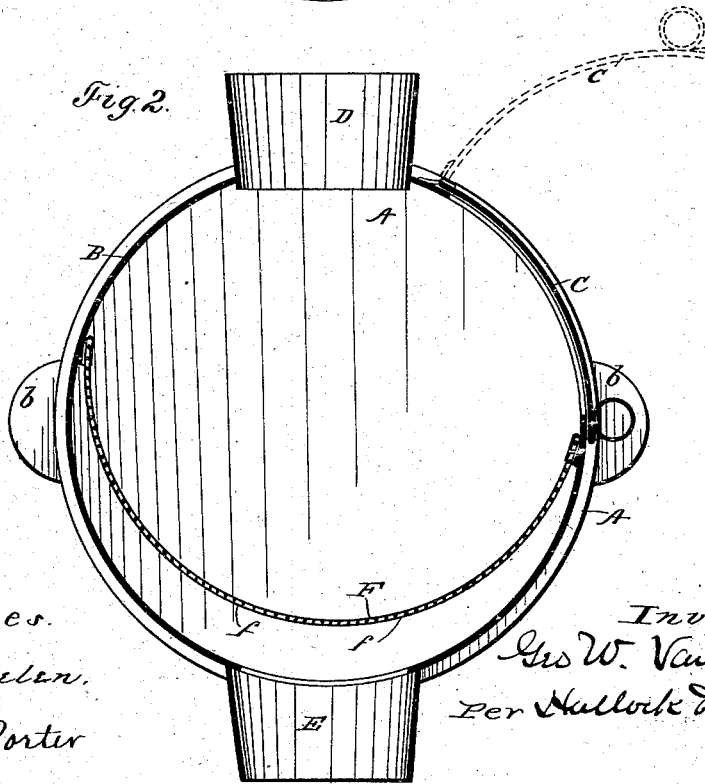
Witnesses.
W. R. Edelen.
Robt. H. Porter.
Inventor
Geo. W. Van Tassel
per Hallock & Hallock
Att's

UNITED STATES PATENT OFFICE.

GEORGE W. VAN TASSEL, OF GIRARD, ASSIGNOR OF ONE-HALF TO FRANCIS X. LOMMER, OF MILLS GROVE, PENNSYLVANIA.

STRAINER FOR EAVES-SPOUTS.

SPECIFICATION forming part of Letters Patent No. 289,473, dated December 4, 1883.

Application filed August 3, 1883. (No model.)

*To all whom it may concern:*

Be it known that I, GEORGE W. VAN TASSEL, a citizen of the United States, residing at Girard, in the county of Erie and State of Pennsylvania, have invented certain new and useful Improvements in Strainers for Eaves-Spouts; and I do hereby declare the following to be a full, clear, and exact description of the invention, such as will enable others skilled in the art to which it appertains to make and use the same.

This invention consists in providing a new and improved strainer attachment for eaves-spouts.

The object of the invention is to provide an eaves-spout with a strainer for removing dirt, leaves, &c., from the rain-water before it passes into the cistern, said strainer to be so constructed that it will not easily clog up, and will, when it does clog, discharge the water from it without causing an overflow at the top of the spout, and also so that when clogged it can be easily cleaned out.

My device is illustrated in the accompanying drawings as follows:

Figure 1 is a perspective view of the device with a part broken away to show construction. Fig. 2 is a vertical section.

A is the body of the strainer. D and E are the parts by which it connects with the eaves-spout. F is the sieve. C is the door and waste way. The body A may be in any form desired—round or drum shaped, as shown, or square, or V-shaped or otherwise—and the sieve may also be varied in shape.

The essential feature of the construction is that the sieve shall extend from points on the sides far above the discharge-pipe E down to or near to said pipe, and shall be sufficiently far from the sides of the body to afford free passage for water at all points. This is clearly shown to be the case in the drawings. The object of this construction is to prevent clogging until a large amount of deposit has accumulated.

It will be seen that as the lowest part of the sieve becomes clogged the water will still have free passage through the upper parts of the sieve, and it will not become wholly clogged until a large amount of deposit has accumulated. The door C is placed above the sieve, and from it the deposit can be easily removed from the device. It will also be seen that when the sieve does become clogged the door C will serve as a spill or waste for the water.

I prefer the form shown in the drawings for the reason that it is easiest to make, and the sieve is easier to clean when curved than when angular.

The case or body A and door are usually made of tin, and the sieve is made of ordinary wire cloth or sieve material, and is secured in the case by solder or otherwise. The pipes D and E are made tapering, so as to easily receive the ordinary eaves-spouting. Ears $b\ b$ are made on the sides of the case to provide for securing the same to the wall of the building. The strainer will generally be placed at some convenient point near the cistern, or where it can be easily observed and reached.

I am aware of the invention shown in Letters Patent No. 174,701, granted to Alfred D. Parker, March 14, 1876, and therefore make no claim to anything therein shown. It will be observed that in that device the strainer does not extend from the door down to near the discharge-pipe and then up again on the opposite side; also, that the door cannot open and serve as a spillway when the sieve becomes clogged, but must be manipulated, while in my device the spill is opened automatically by the action of the water.

What I claim as new is—

In a strainer for eaves-spouts, the combination, with the body A, having inlet and outlet pipes, and a door, C, near the inlet, of a straining-sieve, F, extending from said door down to or near to the outlet-pipe and up again on the opposite side of the body A to a point near the inlet, said sieve being sufficiently removed from the sides of the body to allow the passage of water at all points, substantially as and for the purposes mentioned.

In testimony whereof I affix my signature in presence of two witnesses.

GEO. W. VAN TASSEL.

Witnesses:
W. S. BROWN,
ROBT. H. PORTER.